US008042100B2

(12) United States Patent
Mitran et al.

(10) Patent No.: US 8,042,100 B2
(45) Date of Patent: Oct. 18, 2011

(54) METHODS, SYSTEMS, AND COMPUTER PRODUCTS FOR EVALUATING ROBUSTNESS OF A LIST SCHEDULING FRAMEWORK

(75) Inventors: Marcel Mitran, Markham (CA); Joran S. C. Siu, Thornhill (CA); Alexander Vasilevskiy, Brampton (CA)

(73) Assignee: International Business Machines Corporation, Armonk, NY (US)

( * ) Notice: Subject to any disclaimer, the term of this patent is extended or adjusted under 35 U.S.C. 154(b) by 1086 days.

(21) Appl. No.: 11/845,133

(22) Filed: Aug. 27, 2007

(65) Prior Publication Data

US 2009/0064109 A1    Mar. 5, 2009

(51) Int. Cl.
   *G06F 9/44* (2006.01)
(52) U.S. Cl. .......................... 717/124; 717/161
(58) Field of Classification Search .................. None
   See application file for complete search history.

(56) References Cited

U.S. PATENT DOCUMENTS

| 5,367,687 | A  | * | 11/1994 | Tarsy et al. | 717/149 |
| 2002/0056078 | A1 | * | 5/2002 | Inagaki et al. | 717/155 |
| 2004/0078779 | A1 | * | 4/2004 | Dutt et al. | 717/106 |
| 2004/0078780 | A1 | * | 4/2004 | Dutt et al. | 717/106 |
| 2005/0065811 | A1 | * | 3/2005 | Chu et al. | 705/1 |
| 2005/0216900 | A1 | * | 9/2005 | Shi et al. | 717/161 |
| 2006/0241986 | A1 | * | 10/2006 | Harper | 705/7 |

OTHER PUBLICATIONS

John Cavazos.—Inducing Heuristics to Decide Whether to Schedule. ACM 1-58113-807-5/04/0006. URL: http://portal.acm.org/citation.cfm?id=996864. Publication date: Jun. 9-11, 2004, pp. 183-194.*

Emre Ozer—Unified Assign and Schedule: A New Approoach to Scheduling for Clustered REgister File Microarchitectures—IEEE 0-8186-8609-X/98. URL: http://portal.acm.org/citation.cfm?id=291004. Publication year 1998, pp. 308-315.*
Erik L. Demeulemeester—New Benchmark Results for the Resource-Constrained Project Scheduling Problem. Published by INFORMS. URL: http://www.jstor.org/stable/2634582. Source: Management Science, vol. 43, No. 11 (Nov. 1997), pp. 1485-1492.*
Muchnick, Steven S., 'Advanced Compiler Design Implementation', Morgan Kaufman Publishers, San Francisco, Californai, 1997, Chapter 17, Publication year: 1997, 47 pages.
Spec's Benchmarks and Published Results, [online]; [retrieved on Aug. 20, 2007]; retrieved from the Internet http://www.spec.org/benchmarks.html, Publication date: Aug. 20, 2007, 4 pages.
Schielke, Philip, "Issues in Instruction Scheduling", Ph.D. Thesis Proposal, Rice University, publication date: 1998, 27 pages.

(Continued)

*Primary Examiner* — Thuy Dao
*Assistant Examiner* — Cuong V Luu
(74) *Attorney, Agent, or Firm* — Cantor Colburn LLP; Libby Toub

(57) ABSTRACT

Systems, methods, and computer products for evaluating robustness of a list scheduling framework. Exemplary embodiments include a method for evaluating the robustness of a list scheduling framework, the method including identifying a set of compiler benchmarks known to be sensitive to an instruction scheduler, running the set of benchmarks against a heuristic under test, H and collect an execution time Exec(H[G]), where G is a directed a-cyclical graph, running the set of benchmarks against a plurality of random heuristics $H_{rand}[G]_i$, and collect a plurality of respective execution times $Exec(H_{rand}[G])_i$, computing a robustness of the list scheduling framework, and checking robustness check it against a pre-determined threshold.

5 Claims, 2 Drawing Sheets

OTHER PUBLICATIONS

Gibbons, Philip B. et al., "Efficient Instruction Scheduling for Pipelined Architecture", Proceedings of the ACM SIGPLAN '86 Symposium on Compiler Construction, 21(7): 11-16, Publication date: 86, 6 pages.

Ullman, Jeffrey D., "Complexity of Sequencing Problems", Computer and Job-Shop Scheduling Theory, John Wiley and Sons, New York, 1976, Chapter 4, Publication date: 1976, 28 pages.

* cited by examiner

METHODS, SYSTEMS, AND COMPUTER PRODUCTS FOR EVALUATING ROBUSTNESS OF A LIST SCHEDULING FRAMEWORK

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to compilers, and particularly to systems, methods, and computer products for evaluating robustness of a list scheduling framework.

2. Description of Background

Performance problems in compilers are generally difficult to identify and diagnose. Newly introduced performance regressions could go unnoticed for extended periods of time unless great care is taken with performance regression testing. In practice, however, unmanned automated performance regression testing of compiler components continues to be a difficult problem. Furthermore, with increasing complexity of underlying hardware pipelines and memory hierarchies, failing to model these complex structures can result in generated code being significantly faster or slower than expected.

What is needed is a framework for automated performance testing of instruction scheduler, where the framework is well suited to be used for daily regression testing in production compilers.

SUMMARY OF THE INVENTION

Exemplary embodiments include a method for evaluating the robustness of a list scheduling framework, the method including identifying a set of compiler benchmarks known to be sensitive to an instruction scheduler, running the set of benchmarks against a heuristic under test, H and collect an execution time $Exec(H[G])$, where G is a directed a-cyclical graph, running the set of benchmarks against a plurality of random heuristics $H_{rand}[G]_i$, and collect a plurality of respective execution times $Exec(H_{rand}[G])_i$, computing a robustness of the list scheduling framework, where the robustness is given by:

$$robustness_H(G) = \sum_{h_{rand} \in H_{rand}} \|Exec(h_{rand}[G]), Exec(H[G])\|,$$

and checking robustness check it against a pre-determined threshold.

Further exemplary embodiments include a system for evaluating the robustness of a list scheduling framework, the system including a computer processor, a compiler coupled to the processor, an instruction scheduler coupled to the compiler, a list scheduling framework robustness evaluation process residing on the processor and having instructions to identify a set of compiler benchmarks known to be sensitive to the instruction scheduler, run the set of benchmarks against a heuristic under test, H and collect an execution time Exec (H[G]), where G is a directed a-cyclical graph, run the set of benchmarks against a plurality of random heuristics $H_{rand}[G]_i$, and collect a plurality of respective execution times $Exec(H_{rand}[G])_i$, compute a robustness of the list scheduling framework, where the robustness is given by:

$$robustness_H(G) = \sum_{h_{rand} \in H_{rand}} \|Exec(h_{rand}[G]), Exec(H[G])\|,$$

check robustness check it against a pre-determined threshold and evaluate the random heuristics $H_{rand}[G]_i$, in response to $Exec(h_{rand}[G]_i)$ being a better execution time than $Exec(H[G])$ for the set of benchmarks.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, technically we have achieved a solution which a framework is automated for performance testing of instruction scheduler, where the framework is well suited to be used for daily regression testing in production compilers.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments include systems, methods and computer products for evaluating robustness of a list scheduling framework. In exemplary embodiments, instruction scheduling is a compiler optimization used to improve instruction-level parallelism, which improves performance on machines with instruction pipelines. In exemplary embodiments, testing and debugging methods include a micro-architectural model and list scheduler heuristics. Testing of micro-architecture can be implemented for complex underlying hardware pipelines and memory hierarchies. As such, in accordance with exemplary embodiments, a framework for automated performance testing of instruction scheduler can be implemented for daily regression testing in production compilers.

Figure 1:
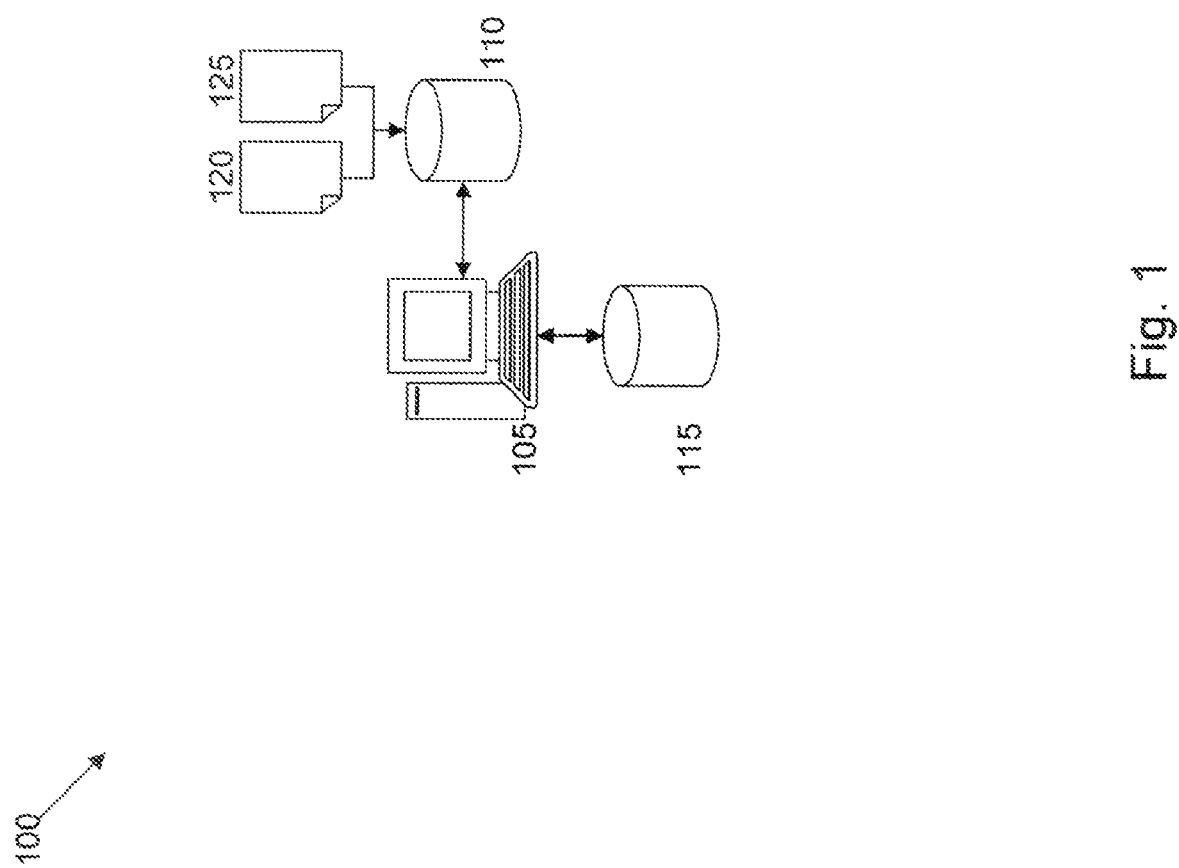
FIG. 1 illustrates an exemplary system for evaluating the robustness of a list scheduling framework.

FIG. 1 illustrates an exemplary system 100 for evaluating the robustness of a list scheduling framework. In exemplary embodiments, the system 100 includes a processing device 105 such as a computer, which includes a storage medium or memory 110. The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processing device 105.

A data repository 115 is coupled to and in communication with the processing device 105. The system 100 can further include a compiler 120. The compiler 120 can be any computer program (or set of programs) that translates text written in a computer language (the source language) into another computer language (the target language). The original sequence is usually called the source code and the output called object code. The system 200 can further include a list scheduling framework robustness evaluation process 125, as further discussed herein.

The general algorithm for a list scheduler involves topological re-ordering of a directed a-cyclical weighted graph (DAWG). The nodes in the graph represent each of the instructions in a basic block, while the directed edges between nodes identify the causal dependencies. In exemplary embodiments, basic block is a sequence of straight-line code of instructions with no branches leading inside the block and no branches going outside of the block. Generally, the edges of the graph are annotated with a weight representing a sum of delays and latencies between the nodes. Delay is incurred, for example, as a result of pipeline stalls that typically occur when an instruction requires the results of another instruction before it can execute. Latency is a characteristic lag time resulting from the execution of an instruction. Both delay and latency may be measured in the same time unit, namely execution cycles, and may be summed together to obtain the "weight" or total time in cycles. In exemplary embodiments, the weighted edges are then used by a given heuristic, H, which loosely couples the topological sort of the DAWG to a better re-ordering of the associated instruction sequence. Such heuristics are proven suboptimal as the problem of scheduling is known to be nondeterministic polynomial-time (NP) hard.

In accordance with exemplary embodiment, the topological sort of a graph, G, can be represented using a heuristic, H, as H[G]. In addition, the actual execution time for a given topological sort H[G] can be represented as Exec{H[G]}.

It is appreciated that several sources of error or inaccuracy can be present in a list scheduling implementation. For example, the weights in the DAWG, G, could model the hardware inaccurately, or the heuristic, H, could be too loosely coupled to the target architecture. The systems and methods described herein automatically evaluate the robustness of the framework represented by H[G].

In accordance with exemplary embodiments, the framework under investigation is compared against a set of non-informative heuristics $H_{rand}[G]$, where $H_{rand}[G]$ can be described as a set of random topological sorts for the given DAWG, G, Comparison requires definition of sufficient spanning set $H_{rand}[G]$ as well as a given distance measure $\|*\|$. Given these functionals, a robustness measure can then be defined as:

$$robustness_H(G) = \sum_{h_{rand} \in H_{rand}} \|Exec(h_{rand}[G]), Exec(H[G])\|$$

Figure 2:
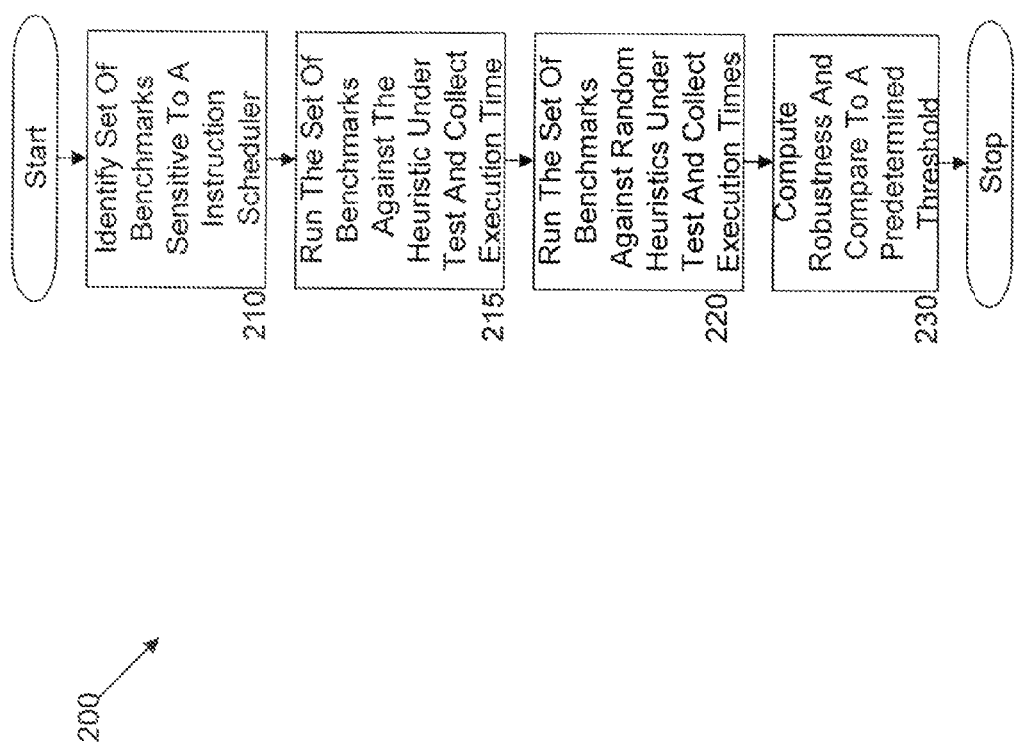
FIG. 2 illustrates a flowchart of a method for evaluating the robustness of a list scheduling framework in accordance with exemplary embodiments.

Therefore, for unmanned daily regression testing, a methodology is identified for a compiler 120 having benchmarks that are sensitive to an instruction scheduler. FIG. 2 illustrates a flowchart of a method 200 for evaluating the robustness of a list scheduling framework in accordance with exemplary embodiments. At step 210, the method 200 identifies a set of benchmarks know to be sensitive to instruction scheduler. At step 215, the benchmarks are run against the heuristic under test, H, and the method 200 collects the execution time Exec (H[G]) At step 220, the same benchmarks are run against several random heuristics $H_{rand}[G]_i$, and the method 200 collects the execution times $Exec(H_{rand}[G])_i$. At step 230, the robustness is computed and checked against some chosen threshold to decide if the robustness is acceptable or not. In exemplary embodiments, if the desired robustness is not achieved, the set of $h_{rand}[G]_i$, where $Exec(h_{rand}[G]_i)$ is better than Exec(H[G]), can be analyzed to improve the heuristic under investigation, and thus the method 200 can be repeated.

In an example using a Gaussian metric, the mean and variance of $Exec[H_{rand}(G)]$ can be represented respectively as:

$$\mu_H(G) = \frac{\sum_{h_{rand} \in H_{rand}} Exec(h_{rand}[G])}{sizeof(G)}$$

$$\sigma_H(G) = \sqrt{\frac{\sum_{h_{rand} \in H_{rand}} (Exec(h_{rand}[G]) - \mu_H)^2}{sizeof(G)}}$$

The robustness of H[G] can then be described as the area under Gaussian($\mu_H$, $\sigma_H$) that performs worst than Exec(H [G]). This metric can be computed over a set of DAWGs, G. The robustness would then be the sum of the areas under all curves normalized against the size of the set G.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold, separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for executable by a processor evaluating a robustness of a list scheduling framework, the method comprising:
    identifying a set of compiler benchmarks known to be sensitive to an instruction scheduler;
    running the set of compiler benchmarks against a heuristic under test, H and collect an execution time Exec(H[G]), where G is a directed a-cyclical graph;
    running the set of compiler benchmarks against a plurality of random heuristics $H_{rand}[G]_i$, and collect a plurality of respective execution times $Exec(H_{rand}[G])_i$
    computing a robustness of the list scheduling framework, where the robustness is given by:

$$robustness_H(G) = \sum_{h_{rand} \in H_{rand}} \|Exec(h_{rand}[G]), Exec(H[G])\|, \text{ and}$$

checking the robustness against a pre-determined threshold.

2. The method as claimed in claim 1 further comprising evaluating random heuristics $H_{rand}[G]_i$, in response to Exec $(H_{rand}[G])_i$ being a better execution time than Exec(H[G]) for the set of compiler benchmarks.

3. The method as claimed in claim 2 wherein a random heuristic of the plurality of random heuristics is a Gaussian metric, having a mean and a variance given respectively by:

$$\mu_H(G) = \frac{\sum_{h_{rand} \in H_{rand}} Exec(h_{rand}[G])}{sizeof(G)}, \text{ and}$$

$$\sigma_H(G) = \sqrt{\frac{\sum_{h_{rand} \in H_{rand}} (Exec(h_{rand}[G]) - \mu_H)^2}{sizeof(G)}}.$$

4. The method as claimed in claim 3 wherein a robustness H[G] is an area defined under a Gaussian ($\mu_H$, $\sigma_H$) that performs worse than Exec(H[G]).

5. A system for evaluating a robustness of a list scheduling framework, the system comprising:
    a computer processor;
    a compiler coupled to the processor;
    an instruction scheduler coupled to the compiler;
    a list scheduling framework robustness evaluation process residing on the processor and having instructions to;
    identify a set of compiler benchmarks known to be sensitive to the instruction scheduler;
    run the set of compiler benchmarks against a heuristic under test, H and collect an execution time Exec(H[G]), where G is a directed a-cyclical graph;
    run the set of compiler benchmarks against a plurality of random heuristics $H_{rand}[G]_i$, and collect a plurality of respective execution times $Exec(H_{rand}[G])_i$;
    compute a robustness of the list scheduling framework, where the robustness is given by:

$$robustness_H(G) = \sum_{h_{rand} \in H_{rand}} \|Exec(h_{rand}[G]), Exec(H[G])\|$$

check the robustness against a pre-determined threshold; and
    evaluate the random heuristics $H_{rand}[G]_i$, in response to $Exec(h_{rand}[G]_i)$ being a better execution time than Exec (H[G]) for the set of compiler benchmarks.

* * * * *